(12) United States Patent
Lin

(10) Patent No.: US 10,854,217 B1
(45) Date of Patent: Dec. 1, 2020

(54) WIND NOISE FILTERING DEVICE

(71) Applicant: Compal Electronics, Inc., Taipei (TW)

(72) Inventor: Chung-Han Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/816,026

(22) Filed: Mar. 11, 2020

(30) Foreign Application Priority Data

Jan. 22, 2020 (TW) .............................. 109102339 A

(51) Int. Cl.
| | |
|---|---|
| *G10L 21/0232* | (2013.01) |
| *G10L 25/21* | (2013.01) |
| *G06F 3/16* | (2006.01) |
| *G06N 3/08* | (2006.01) |
| *G10L 25/30* | (2013.01) |
| *G06N 3/04* | (2006.01) |
| *G10L 25/51* | (2013.01) |

(52) U.S. Cl.
CPC .......... *G10L 21/0232* (2013.01); *G06F 3/165* (2013.01); *G06N 3/0445* (2013.01); *G06N 3/08* (2013.01); *G10L 25/21* (2013.01); *G10L 25/30* (2013.01); *G10L 25/51* (2013.01); *H04R 2225/39* (2013.01); *H04R 2410/07* (2013.01)

(58) Field of Classification Search
CPC .............. H04R 2410/07; H04R 1/1083; H04R 1/1041; H04R 2410/05; H04R 25/43; H04R 2225/39; H04R 2460/01; G10L 21/0208; G10L 21/0232; G10L 21/0216; G10L 2021/02161; G10L 25/30; G10L 25/21; G10L 25/51; G10K 11/17854; G10K 2210/108; G06F 3/165

USPC ... 381/94.1, 71.1, 317, 94.3, 318, 71.11, 58; 704/226
See application file for complete search history.

(56) References Cited

U.S. PATENT DOCUMENTS

| | | | |
|---|---|---|---|
| 8,433,564 | B2 | 4/2013 | Konchitsky |
| 8,914,282 | B2 | 12/2014 | Konchitsky |
| 8,983,833 | B2 | 3/2015 | Joshi et al. |
| 9,094,078 | B2 | 7/2015 | Lee et al. |

(Continued)

FOREIGN PATENT DOCUMENTS

| | | |
|---|---|---|
| EP | 1732352 B1 | 10/2015 |
| TW | I415117 B | 11/2013 |

*Primary Examiner* — Norman Yu
(74) *Attorney, Agent, or Firm* — Kirton McConkie; Evan R. Witt

(57) ABSTRACT

A wind noise filtering device includes a mixer, an extraction unit, a decision unit, a wind noise filter and an output module. The mixer receives a source sound and outputs an input audio. The extraction unit is electrically connected to the mixer to receive the input audio, the extraction unit performs feature extraction on the input audio to generate a plurality of feature data. The decision unit is electrically connected to the extraction unit to receive the feature data, the decision unit outputs a decision signal according to the plurality of feature data. The wind noise filter is electrically connected to the decision unit to receive the decision signal and is controlled to be turned on or off by the decision signal. The output module is electrically connected to the wind noise filter and the mixer to output an output audio according to the input audio or the filtered audio.

10 Claims, 5 Drawing Sheets

1

(56) References Cited

U.S. PATENT DOCUMENTS

| | | | |
|---|---|---|---|
| 2008/0189100 A1* | 8/2008 | LeBlanc | G10L 19/005 704/207 |
| 2016/0155453 A1* | 6/2016 | Harvey | G10L 25/18 381/26 |

* cited by examiner

US 10,854,217 B1

WIND NOISE FILTERING DEVICE

CROSS-REFERENCE TO RELATED APPLICATION

This application claims priority to Taiwan Patent Application No. 109102339, filed on Jan. 22, 2020, the entire content of which is incorporated herein by reference for all purposes.

FIELD OF THE INVENTION

The present disclosure relates to a filtering device, and more particularly to a wind noise filtering device.

BACKGROUND OF THE INVENTION

Recently, the technology of wind noise filter is widely used in various video recorders or recording equipments. When recording video or audio, the wind noise is often recorded at the same time, which affects the recording quality. For this reason, a wind noise filter is set to filter the recorded wind noise.

The common wind noise filtering device is mostly fixed filtering device. That is, the wind noise filtering device is activated when recording video or audio, and the wind noise filtering device filters in a specific frequency band to suppress the wind noise. However, because the filtering frequency band of the wind noise filtering device cannot be switched or adjusted according to actual environment factors, it may cause the output volume unstable or even distorted. For example, the wind noise filter also filters the recorded sound when the wind noise does not exist, which results in small volume and distortion of the recorded sound. Even when there is wind noise in the recorded sound, the volume of the filtered recorded sound will fluctuate with the variation of the ambient wind due to the real-time change of the ambient wind volume and wind speed and the limitation of the fixed filtering band of the wind noise filter.

Therefore, there is a need of providing a wind noise filtering device to obviate the drawbacks encountered from the prior arts.

SUMMARY OF THE INVENTION

It is an object of the present disclosure to provide a wind noise filtering device. By determining if there exists wind noise in the recorded sound to turn on or turn off the wind noise filter correspondingly. Therefore, the wind noise filter is turned on to filter out the wind noise when the wind noise exists, and the wind noise filter is turned off to avoid the recorded sound being too small or distorted due to the filtering when the wind noise does not exist.

It is another object of the present disclosure to provide a wind noise filtering device. The wind noise filtering device adjusts the filtering frequency band of the wind noise filter in real time according to the variation of the wind noise, thereby keeping the volume of the output sound consistent.

In accordance with an aspect of the present disclosure, there is provided a wind noise filtering device. The wind noise filtering device includes a mixer, an extraction unit, a decision unit, a wind noise filter and an output module. The mixer receives a source sound and outputs an input audio. The extraction unit is electrically connected to the mixer to receive the input audio, and the extraction unit performs feature extraction on the input audio to generate a plurality of feature data. The decision unit is electrically connected to the extraction unit to receive the plurality of feature data, and the decision unit outputs a decision signal according to the plurality of feature data. The wind noise filter is electrically connected to the decision unit to receive the decision signal. The wind noise filter is controlled to be turned on or off by the decision signal. The wind noise filter filters the input audio and outputs a filtered audio when the wind noise filter is turned on. The output module is electrically connected to the wind noise filter and the mixer, the output module is configured for receiving the input audio and the filtered audio and outputting an output audio according to the input audio or the filtered audio.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
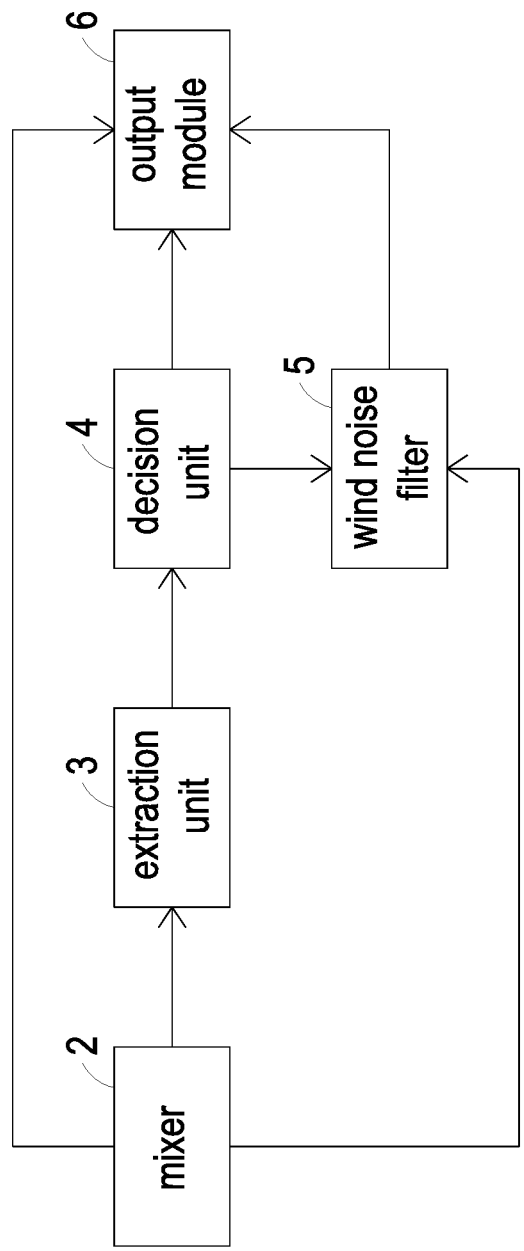
FIG. 1 is a schematic circuit diagram illustrating a wind noise filtering device according to an embodiment of the present disclosure.

FIG. 1 is a schematic circuit diagram illustrating a wind noise filtering device according to an embodiment of the present disclosure. As shown in FIG. 1, the wind noise filtering device 1 includes a mixer 2, an extraction unit 3, a decision unit 4, a wind noise filter 5 and an output module 6. The mixer 2 receives a source sound and outputs an input audio. The extraction unit 3 is electrically connected to the mixer 2 to receive the input audio, and the extraction unit 3 performs feature extraction on the input audio to generate a plurality of feature data. The decision unit 4 is electrically connected to the extraction unit 3. The decision unit 4 receives the plurality of feature data and determines whether there exists wind noise in the input audio according to the plurality of feature data, and the decision unit 4 outputs a decision signal correspondingly. The wind noise filter 5 is electrically connected to the mixer 2 and the decision unit 4, and the wind noise filter 5 receives the decision signal. The wind noise filter 5 is controlled to be turned on or off by the decision signal. The wind noise filter 5 filters the input audio and outputs a filtered audio when the wind noise filter 5 is turned on. The output module 6 is electrically connected to the wind noise filter 5 and the mixer 2. The output module 6 is configured for receiving the input audio and the filtered audio and outputting an output audio according to the input audio or the filtered audio. In specific, the output module 6 outputs the output audio according to the input audio when the wind noise filter 5 is turned off, and the output module 6 outputs the output audio according to the filtered audio when the wind noise filter 5 is turned on. Thereby, the wind noise filter 5 filters out the wind noise, and the wind noise filter 5 is turned off to avoid the output audio being too small and distorted due to the filtering when there is no wind noise in the input audio. In an embodiment, the output module 6 further includes an audio processor, and the audio processor is configured for performing audio processing on the input audio or the filtered audio.

Figure 2:
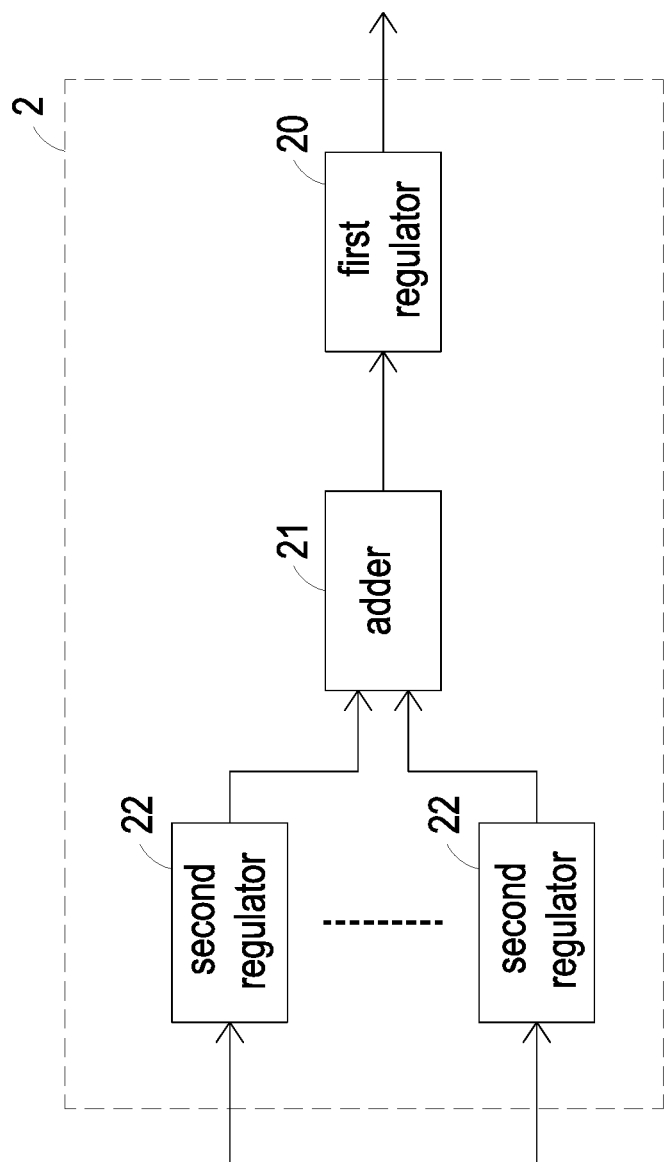
FIG. 2 is a schematic circuit diagram illustrating the mixer of FIG. 1.

FIG. 2 is a schematic circuit diagram illustrating the mixer of FIG. 1. As shown in FIG. 2, in an embodiment, the mixer 2 further includes a first regulator 20. The first regulator 20 is configured for adjusting the volume of the source sound and outputting the input audio according to the adjusted source sound. The mixer 2 is not limited to receiving a single source sound. In an embodiment, the mixer 2 receives a plurality of source sounds, and the mixer 2 further includes a plurality of second regulators 22 and an adder 21. The plurality of second regulators 22 receive the plurality of source sounds from different directions and adjust the volume of the plurality of source sounds respectively. The adder 21 is electrically connected to the plurality of second regulators 22 and the first regulator 20. The adder 21 receives and combines the adjusted source sounds from different directions. The first regulator 20 receives and adjusts the volume of combined audios and outputs the input audio accordingly.

In an embodiment, the wind noise filtering device 1 further includes a microphone array (not shown). The microphone array is electrically connected to the mixer 2. The microphone array includes a plurality of directional microphones, and the plurality of directional microphones receives the plurality of source sounds respectively. The wind noise filtering device 1 performs power estimation on the plurality of source sounds and determines the sound source according to the results of the power estimation. Thereby, the wind noise filtering device 1 enhances the volume of the source sounds from the sound source and attenuates the volume of the other source sounds. Therefore, the microphone array eliminates the surrounding noise to enhance the input audio and improves the quality of the recorded sound.

Figure 3:
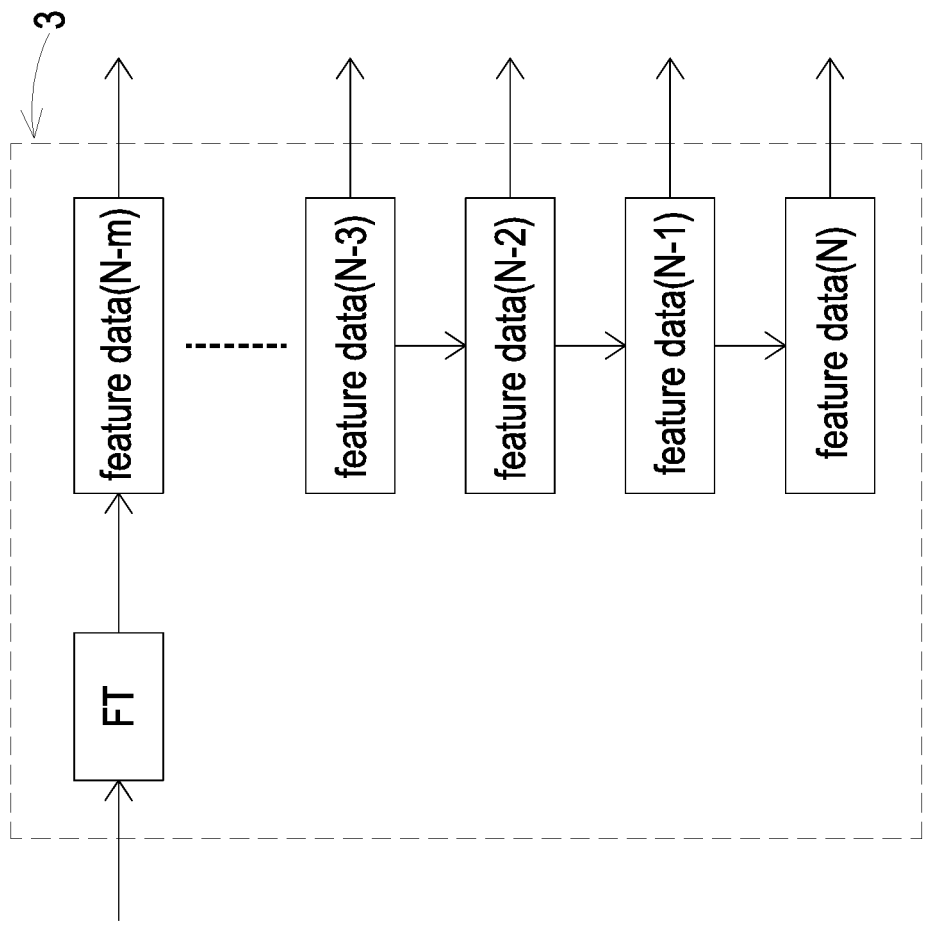
FIG. 3 is a schematic block diagram illustrating the extraction unit of FIG. 1.

FIG. 3 is a schematic block diagram illustrating the extraction unit of FIG. 1. As shown in FIG. 3, in an embodiment, the extraction unit 3 transforms the input audio from time domain to frequency domain. The way of transforming can be for example but not limited to Fourier Transform (FT), Discrete Fourier Transform (DFT), Fast Fourier Transform (FFT) or Discrete Cosine Transform (DFT). The extraction unit 3 extracts the input audio in a specific frequency band (for example 0-1 kHz but not exclusively) on the frequency spectrum and outputs the plurality of feature data. Specifically, the extraction unit 3 extracts the input audio multiple times, and the interval between two extracting is a unit time. N represents the total amount of the feature data, and m represents the amount of unit time passed since the extraction unit 3 started extracting. The frequency spectrum can be for example but not limited to Mel-Frequency Cepstrum.

The decision unit 4 includes a deep learning model. The deep learning model is a branch of machine learning. Deep learning model is trained by a specific type of historical data, thus the computing model is built accordingly. The development of deep learning model so far has several deep learning frameworks, such as Deep Neural Networks (DNN), Convolutional Neural Networks (CNN), Recurrent Neural Network (RNN), which have been widely used in computer vision, speech recognition, face recognition, natural language processing and audio recognition. The term "train" means that a large amount of historical data in a specific field is utilized to train the deep learning model for allowing the deep learning model to have the relevant ability to think and judge in the specific field. For example, if a deep learning model is applied in the present disclosure, the database of the deep learning model collects multiple pieces of data in advance, and it is known whether there is wind noise in the multiple pieces of data. Therefore, the deep learning model is trained by the multiple pieces of data for making the deep learning model have the ability to judge the presence or absence of the wind noise. Thereby, when the decision unit 4 receives a plurality of feature data, the deep learning model can perform a neural network-like operation based on the received plurality of feature data and determine whether there is wind noise in the input audio.

In addition, since the wind noise actually has a temporal correlation in time domain, the unit time of the extraction interval in the process of performing feature extraction is shorter than the time length of the feature data. Correspondingly, the time of the feature data extracted at two adjacent time points would partially overlap and have a correlation relationship. In an embodiment, the deep learning model of the decision unit 4 is a recursive neural network. The recursive neural network uses the adjacent feature data to perform front-to-back comparison to determine whether the input audio has wind noise, thereby improving its decision accuracy.

Figure 4:
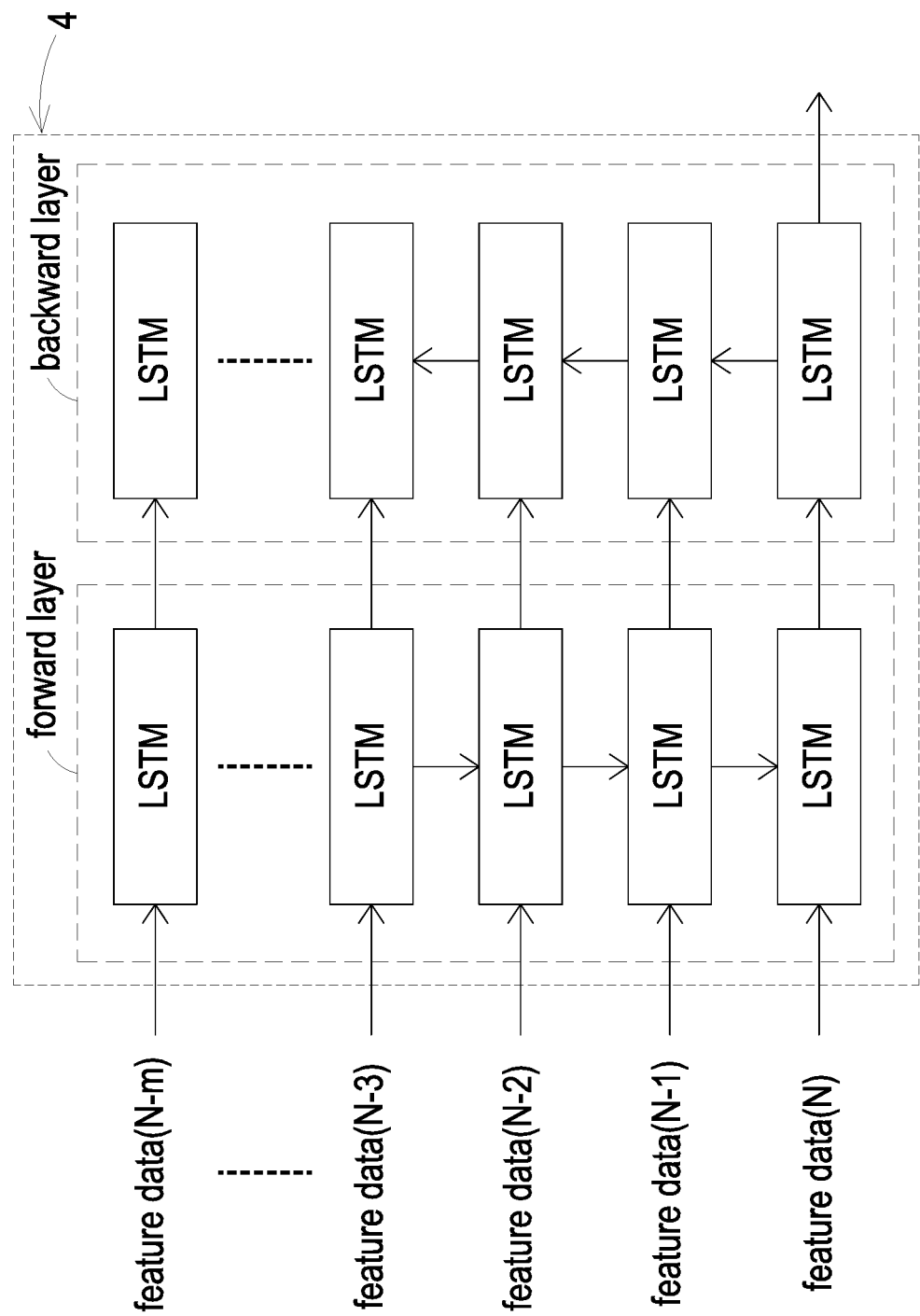
FIG. 4 is a schematic block diagram illustrating the decision unit of FIG. 1.

As shown in FIG. 4, in an embodiment, the deep learning model of the decision unit 4 is a LSTM (Long Short-Term Memory) model. LSTM model is a temporal recurrent neural network, which can be used as a complex non-linear unit for constructing a larger deep neural network. LSTM model includes a forward layer and a backward layer, and the forward layer and the backward layer have a plurality of long-term and short-term memories respectively. In LSTM model, the data farther from the current time has a lower correlation with the current data. Conversely, the data closer to the current time is more relevant to the current data. Therefore, the LSTM model assigns the corresponding weights based on the time distance between the previous data and the current data, and makes a comprehensive decision to output a decision signal.

In addition, the wind noise filter 5 filters the input audio according to the set parameters when the noise filter 5 is turned on. The parameter setting would affect the output of the wind noise filter 5. The following examples show different kinds of parameter setting.

In an embodiment, the parameters of the wind noise filter 5 are set in advance by the user, and the user adjusts the parameters according to actual needs during the process.

Figure 5:
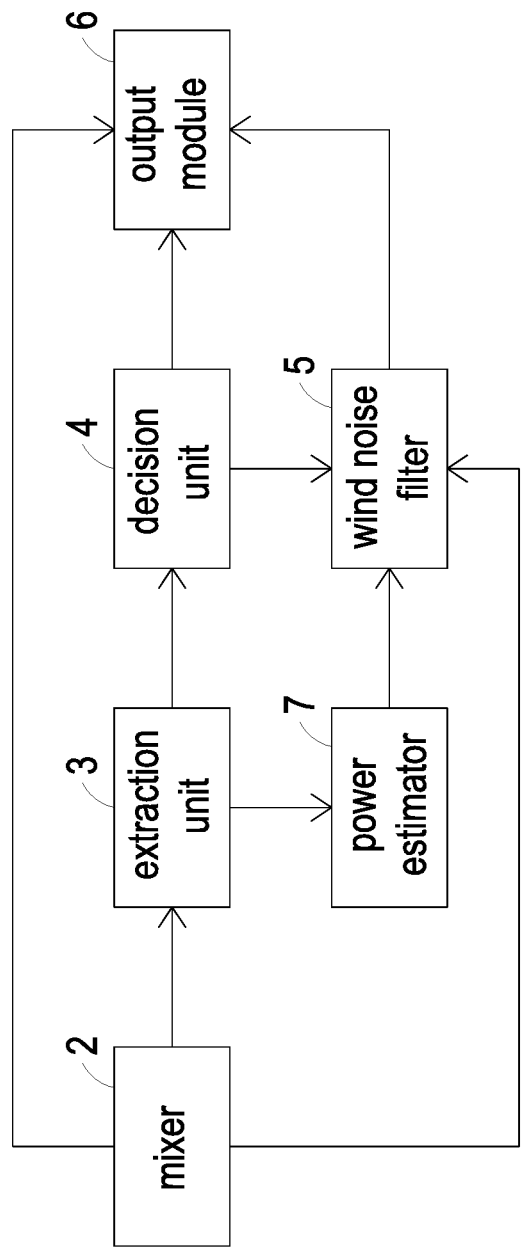
FIG. 5 is a schematic circuit diagram illustrating a wind noise filtering device according to another embodiment of the present disclosure.

In an embodiment, as shown in FIG. 5, the wind noise filtering device 1 further includes a power estimator 7. The power estimator 7 is electrically connected between the extraction unit 3 and the wind noise filter 5. The power estimator 7 is configured for estimating the power of the feature data and outputting a power level to the wind noise filter 5. In this embodiment, the wind noise filter 5 is a fixed-parameter wind noise filer, in other word, the wind noise filter 5 has a parameter group in advance. When the wind noise filter 5 is turned on, the wind noise filter 5 selects the corresponding parameter in the parameter group according to the input power level and filters the input audio according to the selected parameters. For example, after the power estimator 7 performs power estimation on the plurality of feature data, the power estimator 7 outputs a plurality of power levels corresponding to the plurality of time interval respectively, and then the wind noise filter 5 filters the input audio according to the corresponding power level at each time interval. Different power levels are corresponding to different degrees of filtering (such as the filtering frequency band). Therefore, the volume variation at each time interval can be known, and the filtering frequency band of the wind noise filter can be adjusted accordingly, so that the volume of the output sound can be kept consistent.

In an embodiment, the wind noise filter 5 of the wind noise filtering device 1 is an adaptive filter. The filtered audio outputted by the wind noise filter 5 is transmitted back to the wind noise filter 5. After outputting the filtered audio multiple times, the wind noise filter 5 can dynamically adjust the parameters of wind noise filter 5 according to the previous outputted filtered audio, and the wind noise filter 5 filters the currently received input audio according to the dynamically adjusted parameters.

From the above descriptions, the present disclosure provides a wind noise filtering device. In the wind noise filtering device, by determining if there exists wind noise in the recorded sound to correspondingly turn the wind noise filter on or off. Therefore, the wind noise filter is turned on to filter out the wind noise when the wind noise exists, and the wind noise filter is turned off to avoid the recorded sound being too small or distorted due to the filtering when the wind noise does not exist. Additionally, the wind noise filtering device adjusts the filtering frequency band of the wind noise filtering device in real time according to the variation of the wind noise, thereby keeping the volume of the output sound consistent.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wind noise filtering device, comprising:
a mixer receiving a source sound and outputting an input audio;
an extraction unit electrically connected to the mixer for receiving the input audio, wherein the extraction unit performs feature extraction on the input audio to generate a plurality of feature data;
a decision unit electrically connected to the extraction unit, wherein the decision unit receives the plurality of feature data and outputs a decision signal according to the plurality of feature data;
a wind noise filter electrically connected to the decision unit for receiving the decision signal, wherein the wind noise filter is controlled to be turned on or off by the decision signal, and the wind noise filter filters the input audio and outputs a filtered audio when the wind noise filter is turned on; and
an output module electrically connected to the wind noise filter and the mixer and configured for receiving the input audio and the filtered audio and outputting an output audio according to the input audio or the filtered audio.

2. The wind noise filtering device according to claim 1, wherein the output module further comprises an audio processor configured for performing audio processing on the input audio or the filtered audio.

3. The wind noise filtering device according to claim 1, wherein the decision unit comprises a deep learning model, and the deep learning model performs a neural network-like operation based on the received plurality of feature data and outputs the decision signal.

4. The wind noise filtering device according to claim 3, wherein the deep learning model comprises a recurrent neural network or a long short-term memory model.

5. The wind noise filtering device according to claim 1, wherein the extraction unit transforms the input audio from time domain to frequency domain, and the extraction unit extracts the input audio in a specific frequency and outputs the plurality of feature data.

6. The wind noise filtering device according to claim 1, wherein a unit time of an extraction interval in a process of performing feature extraction is shorter than a time length of the feature data.

7. The wind noise filtering device according to claim 1, further comprising a power estimator, wherein the power estimator is electrically connected between the extraction unit and the wind noise filter, the power estimator is configured for estimating the power of the feature data and outputting a power level to the wind noise filter, the wind noise filter has a parameter group in advance, when the wind noise filter is turned on, the wind noise filter selects a corresponding parameter in the parameter group according to the input power level and filters the input audio according to the selected parameters.

8. The wind noise filtering device according to claim 1, wherein the wind noise filter is an adaptive filter, the filtered audio outputted by the wind noise filter is transmitted back to the wind noise filter, the wind noise filter dynamically adjusts the parameters of the wind noise filter according to the previous outputted filtered audio, and the wind noise filter filters the currently received input audio according to the dynamically adjusted parameters.

9. The wind noise filtering device according to claim 1, wherein the mixer further comprises a first regulator configured for adjusting the volume of the source sound.

10. The wind noise filtering device according to claim 9, wherein the mixer further comprises a plurality of second regulators and an adder, the plurality of second regulators receive the plurality of source sounds from different directions and adjust the volume of the plurality of source sounds respectively, the adder is electrically connected to the plurality of second regulators and the first regulators, the adder receives and combines the adjusted source sounds from different directions, and the first regulator receives and adjusts the volume of combined audios.

* * * * *